US012663218B2

(12) United States Patent
Ricard et al.

(10) Patent No.: US 12,663,218 B2
(45) Date of Patent: Jun. 23, 2026

(54) SUSPENSION PYLON FOR AN AIRCRAFT ENGINE FITTED WITH A COUNTERFLOW COOLING EXCHANGER

(71) Applicant: LIEBHERR AEROSPACE TOULOUSE SAS, Toulouse (FR)

(72) Inventors: Didier Ricard, Toulouse (FR); Florian Bonnivard, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 122 days.

(21) Appl. No.: 18/575,834

(22) PCT Filed: Jul. 12, 2022

(86) PCT No.: PCT/EP2022/069394
§ 371 (c)(1),
(2) Date: Dec. 30, 2023

(87) PCT Pub. No.: WO2023/285426
PCT Pub. Date: Jan. 19, 2023

(65) Prior Publication Data
US 2024/0351695 A1 Oct. 24, 2024

(30) Foreign Application Priority Data

Jul. 16, 2021 (FR) ...................................... 2107724

(51) Int. Cl.
*F28D 9/00* (2006.01)
*B64D 27/40* (2024.01)
*F28D 21/00* (2006.01)

(52) U.S. Cl.
CPC ......... *F28D 9/0006* (2013.01); *B64D 27/402* (2024.01); *F28D 9/0093* (2013.01); *F28D 2021/0021* (2013.01)

(58) Field of Classification Search
CPC ........ B64D 27/40; B64D 13/00; B64D 13/06; B64D 27/18; B64D 27/402;
(Continued)

(56) References Cited

U.S. PATENT DOCUMENTS 3,759,323 A * 9/1973 Dawson .................. F02C 7/105
165/DIG. 387
3,866,674 A * 2/1975 Tramuta ................ F28D 9/0031
165/145
(Continued)

*Primary Examiner* — Harry E Arant
(74) *Attorney, Agent, or Firm* — CRGO Global; Steven M. Greenberg

(57) ABSTRACT

The invention relates to an aircraft pylon comprising a cooling exchanger (10) with counterflow of a flow of hot primary air (22) by a flow of cold secondary air (24) flowing oppositely to each other in a longitudinal direction (L), characterized in that it comprises two bundles (10*a*, 10*b*) juxtaposed on both sides of a central axis (12) and each comprising a plurality of parallel longitudinal plates (15) forming a hot pass and a cold pass of the bundle, and in that one of the hot or cold passes of each bundle is supplied by a central inlet (14*a*) common to the two bundles (10*a*, 10*b*) and one of the hot or cold passes of each bundle opens into a central outlet (16) common to the two bundles, said inlets (14*b*, 14*c*) and outlets (16*b*, 16*c*) of the conjugate passes, referred to as side inlets and outlets, being separate and diverging laterally from said central axis (12).

3 Claims, 3 Drawing Sheets

(58) Field of Classification Search
CPC ... B64D 2013/0618; F28D 9/00; F28D 21/00;
F28D 9/0062; F28D 9/0093; F28D
9/0006; F28D 2021/0021; F02C 7/14;
F05D 2260/213
See application file for complete search history.

(56) References Cited

U.S. PATENT DOCUMENTS

| 5,729,969 A | * | 3/1998 | Porte | F02C 7/185 |
| | | | | 60/782 |
| 10,619,936 B2 | | 4/2020 | Schwalm | |

* cited by examiner

[Fig. 1]

[Fig. 2]
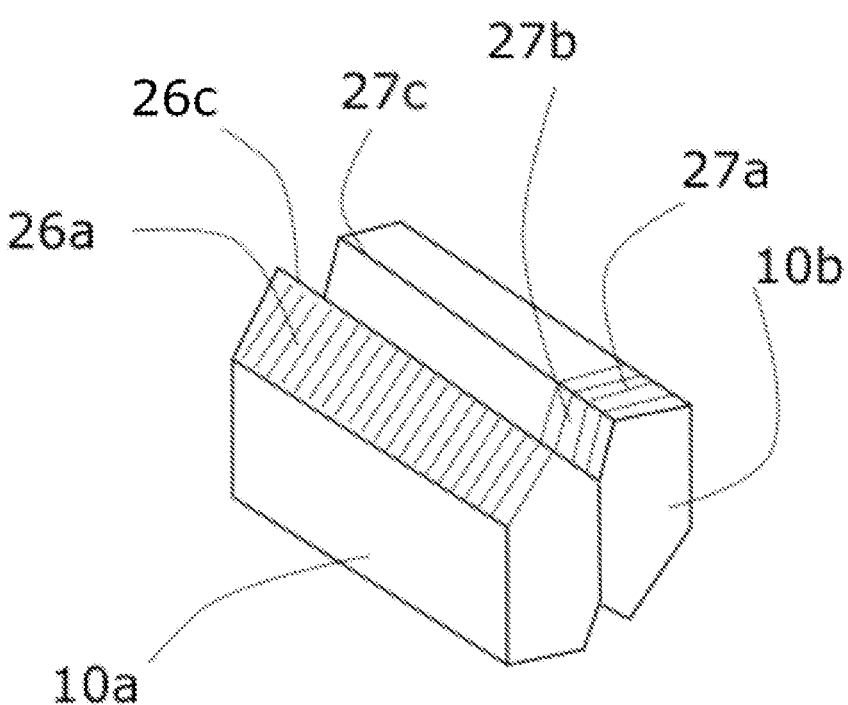

[Fig. 3]

SUSPENSION PYLON FOR AN AIRCRAFT ENGINE FITTED WITH A COUNTERFLOW COOLING EXCHANGER

CROSS-REFERENCE TO RELATED APPLICATIONS

This application is a § 371 national phase entry of International Application No. PCT/EP2022/069394, filed Jul. 12, 2022, which claims priority to French Patent Application No. FR2107724 filed on Jul. 16, 2021.

TECHNICAL FIELD OF THE INVENTION

The invention relates to a suspension pylon (or mast) for an aircraft engine fitted with a heat exchange device, such as a cooling exchanger, intended to be fitted to an air system of an aircraft, such as an air-conditioning system.

TECHNICAL BACKGROUND

An air system of an aircraft such as an environmental control system of a cabin of an aircraft, better known by the acronym ECS, is intended to supply the cabin of the aircraft (which generally designates any internal space of the aircraft where the pressure and/or temperature of the air must be controlled, such as a passenger cabin, the cockpit, a hold, etc.) with air at controlled pressure and/or temperature.

In order to do this, a known method is to draw air under high pressure from the propulsion engines of the aircraft and to process this air (also known as bleed air) by a number of items of equipment in order to bring it to a temperature and pressure which are compatible with the requirements of the cabin.

This equipment includes at least one precooling air/air heat exchanger which is intended to cool the air drawn from the propulsion engines of the aircraft by a cold air flow. This exchanger is often referred to as a precooler.

Such a heat exchanger generally comprises a transverse hot circuit and a transverse cold circuit which are configured to be able to ensure heat exchanges between the air flow carried by the hot circuit (also designated hereinunder as the hot pass) and the cold air flow carried by the cold circuit (also designated hereinunder as the cold pass).

There are also exchangers with counterflow hot and cold circuits, i.e. the hot and cold air flows go in parallel directions opposite to each other.

Irrespective of the structure of the exchanger, the cold circuit can, for example, be supplied by an air flow drawn from the secondary flow of the engine, known as fan air, the temperature of which is close to the external environment of the aircraft, and which, in flight, can thus reach temperatures of the order of −50° C. and a pressure of the order of 200 mbar.

The cold circuit can also be supplied by an air flow drawn from a scoop of the aircraft which supplies an air duct, more often known as RAM air.

The hot circuit can be supplied directly by the air drawn from the propulsion engines or by air from the engines and already partially processed by equipment upstream of the air-conditioning system.

Most heat exchangers currently used on board aircraft are formed by a generally rectangular heat exchange chamber which houses a stack of plates or vanes (also referred to as a "bundle" of plates or vanes) which form stacked flow ducts, for the hot pass and for the cold pass in alternation. Thus, the hot pass which supplies one face of the exchanger flows in the ducts of the different layers and the cold pass which supplies one face of the exchanger (perpendicular for the transverse exchangers and opposite for the counterflow exchangers) flows in the ducts interleaved between two ducts of the hot pass. This architecture makes it possible to interleave each hot duct between two cold ducts over the whole length or height of the exchanger and thus to ensure heat exchanges between the two fluids.

Applications EP3521589 and EP3521590 in the name of the Applicant describe examples of precoolers.

These heat exchangers make it possible to cool the air drawn from the engines or the ambient air compressed by dedicated compressors, before being processed by the other items of equipment of the air conditioning system in order to be able to supply the cabin of the aircraft. The cooling capacity of an exchanger is directly proportional to its size.

The inventors have thus sought a novel solution making it possible to increase the exchange surfaces within an exchanger while imposing maximum limitation on the size of the exchanger, this being done to optimize the installation of the exchanger in an aircraft pylon.

In particular, the inventors have sought to develop an aircraft pylon equipped with a heat exchanger which can be used, not only within the framework of the air conditioning systems of a transport vehicle such as an aircraft, but also in all types of cooling system requiring the cooling of a hot fluid from a source of hot fluid by a cold fluid from a source of cold fluid.

AIMS OF THE INVENTION

The invention aims to provide an aircraft pylon fitted with a cooling exchanger (better known as a precooler) intended to be used in an air system of an aircraft.

The invention aims more particularly to provide a pylon fitted with a cooling exchanger which makes it possible to increase the exchange surfaces while limiting the size of the exchanger.

The invention also aims to provide, in at least one embodiment, a pylon fitted with a cooling exchanger which makes it possible to optimize the space it takes up when incorporated into the pylon.

The invention also aims to provide, in at least one embodiment, a pylon fitted with a cooling exchanger which can be connected to various sources of hot and cold air depending on the constraints of incorporation.

DESCRIPTION OF THE INVENTION

In order to do this, the invention relates to a suspension pylon for a propulsion engine of an aircraft under a wing of an aircraft having a main axis, characterized in that it comprises:

a counterflow cooling exchanger of a flow of hot primary air by a flow of cold secondary air flowing oppositely to each other in a direction, referred to as the longitudinal direction, coinciding with said main axis, said exchanger comprising two plate exchanger blocks, referred to as bundles, juxtaposed one beside the other on both sides of a central juxtaposition axis extending in said longitudinal direction, and each comprising:

a plurality of parallel longitudinal plates forming in alternation flow ducts for the flow of hot primary air, which define a hot pass of the bundle, and flow ducts for the flow of cold secondary air, which define a cold pass of the bundle, a hot air inlet and a hot air outlet arranged respectively at each longitudinal end of said bundle, a cold air inlet and a cold air outlet arranged respectively at each longitudinal end of said bundle, said hot passes of the two bundles being in fluid communication with a central inlet common to the two bundles forming said hot air inlets of the two bundles and with a central outlet common to the two bundles forming said hot air outlet of said bundles, and said cold passes of the two bundles being in fluid communication with separate side inlets and side outlets which diverge laterally from said central axis, these separate side inlets being supplied by fresh ambient air drawn from the proximity of said pylon, conduits for distribution of hot air suitable for fluidly connecting a device for drawing air from said aircraft engine and said central inlet common to the two bundles.

Thus, and contrary to most of the cooling exchangers currently installed in aircraft which generally comprise a simple heat exchange circuit (one hot pass and one cold pass which cross at 90° to each other), the exchanger of the pylon in accordance with the invention comprises a complex heat exchange circuit (two hot passes and two cold passes arranged in counterflow to each other).

The cooling exchanger of the pylon in accordance with the invention has the feature of comprising two juxtaposed adjacent bundles supplied by a common inlet and opening into a common outlet.

The cooling exchanger of the pylon in accordance with the invention thus makes it possible to offer a large cold supply surface (the exchanger being supplied with cold air by the side inlets) and a common central hot supply.

The exchanger of the pylon in accordance with the invention optimizes the space it takes up when incorporated into the engine environment.

In accordance with the invention, said hot passes of the two bundles are in fluid communication with said common inlet and said common outlet, and said cold passes of the two bundles are in fluid communication with the separate side inlets and the separate side outlets.

In other words, said hot passes of the two bundles are supplied by a common inlet and open into a common outlet, and said cold passes of the two bundles are supplied by the separate side inlets and open into the separate side outlets.

Thus, and in accordance with the invention, the exchanger comprises a supply of hot air common to the two bundles and two side supplies of cold air each dedicated to one bundle. The hot pass is thus split in two, in the two juxtaposed bundles, and each bundle ensures cooling by a dedicated cold pass. This makes possible a high degree of cooling of the hot air flow supplying the exchanger.

In accordance with the invention, the outlet of the hot pass is also common to the two bundles and the cold outlets are separate and each dedicated to one bundle.

The invention optimizes the incorporation of the exchanger within the pylon of an aircraft by orientating the exchanger so that the longitudinal direction of the exchanger (which coincides with the juxtaposition axis) coincides with the main direction of the pylon (which coincides with the main axis of the engine), the cold air inlets being arranged towards the front of the aircraft. In this way, the side inlets for cold air can be supplied by the ambient air present on both sides of the pylon and entering the pylon via cold air intakes provided on both sides of the pylon facing the side inlets of the exchanger. The movement of the aircraft in flight naturally and spontaneously leads to the intake of cold air on both sides of the pylon in order to supply the cold passes of the exchanger.

Advantageously and in accordance with the invention, the cold and/or hot passes of the two bundles are separated by a central closure bar.

According to this variant, there is a separation of the hot and/or cold flows between the two bundles in the counterflow flow zone of the air flows by the presence of central closure bars.

Advantageously and in accordance with the invention, each bundle of the exchanger is housed in a housing comprising, at each longitudinal end, an end wall formed from two openwork planes inclined with respect to the longitudinal direction and connected by a joint edge which extends perpendicularly to said longitudinal direction, each inclined openwork plane forming a side inlet or a side outlet of one of the passes of said bundle, and each pair of inclined openwork planes of the two bundles arranged facing each other forming an inlet common to said bundles and/or an outlet common to said bundles.

The exchanger according to this particular structure makes it possible in a simple and economic manner to form the central inlet common to the two adjacent bundles and the central outlet common to the two adjacent bundles by the combination of two inclined openwork planes facing each other. The inclination with respect to the longitudinal direction of the inclined planes forming the common inlet and/or the common outlet is preferably between 0 and 90°, preferably between 30 ad 60°. A supply conduit of the common central inlet and a collecting conduit of the common central outlet can be mounted respectively on the common central inlet and on the common central outlet in order to ensure the supply and collection of the corresponding air flows, for example, by bearing against the joint edges.

The invention also relates to a system for cooling a hot air flow by a cold air flow.

The cooling system in accordance with the invention comprises:

at least one source of hot air and at least one source of cold air, at least one collector of hot air and at least one collector of cold air, a cooling exchanger in accordance with the invention, a network of air flow conduits connecting at least said source of hot air to said hot air inlets of said exchanger, at least said source of cold air to said cold air inlets of said exchanger, at least said hot air outlets of said exchanger to said hot air collector, at least said cold air outlets of said exchanger to said cold air collector.

Advantageously and in accordance with the invention, each flow conduit is fitted with at least one valve for regulation of the air flow flowing in the conduit.

LIST OF FIGURES

Other aims, features and advantages of the invention will become apparent upon reading the following description given solely in a non-limiting way and which makes reference to the attached figures in which:

Figure 1:
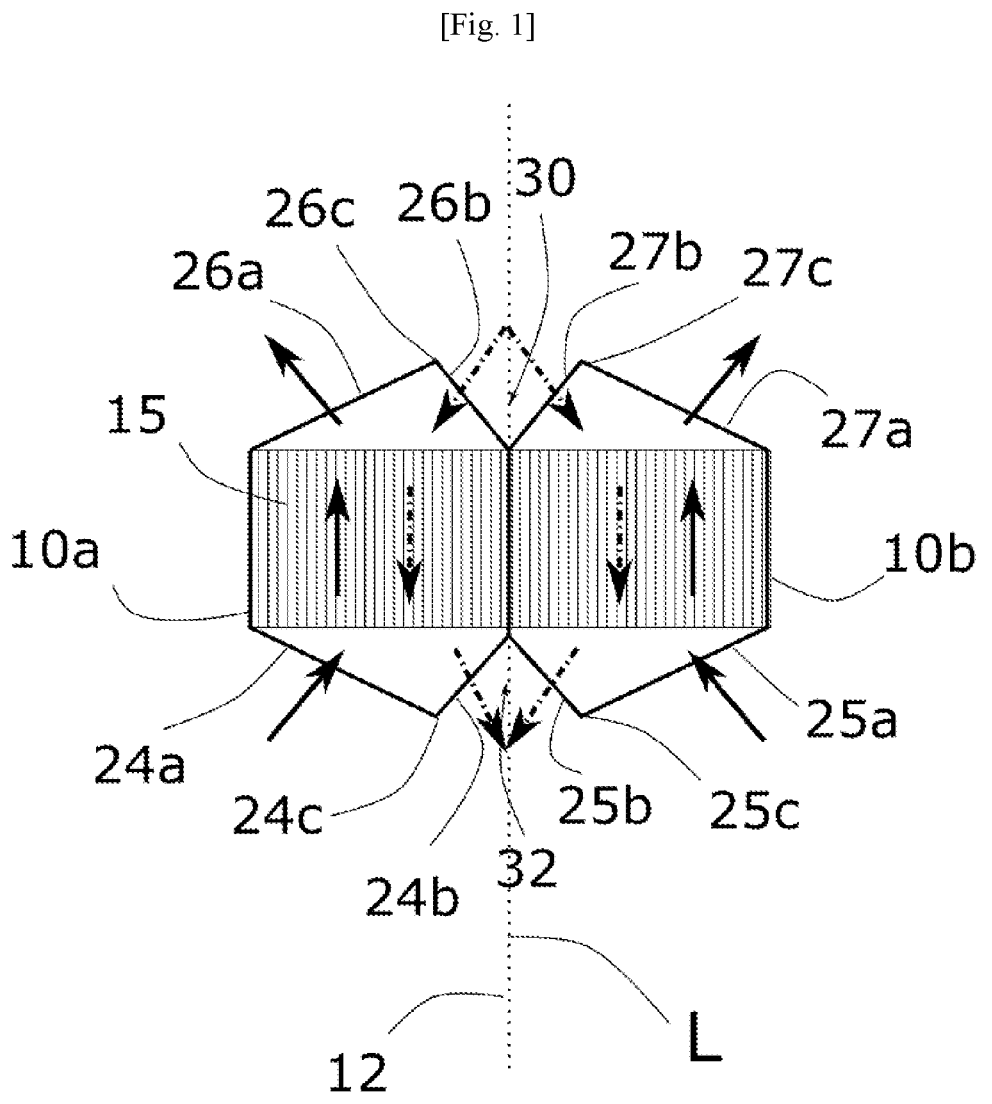

FIG. 1 is a schematic cross-sectional view of a cooling exchanger of a pylon in accordance with a first embodiment variant of the invention, FIG. 2 is a schematic perspective view of a cooling exchanger of a pylon in accordance with one embodiment of the invention enabling the overall shape of the exchanger to be grasped, FIG. 3 is a schematic view of a suspension pylon for an aircraft engine in accordance with one embodiment of the invention fitted with the exchanger of FIG. 1.

DETAILED DESCRIPTION OF AN EMBODIMENT OF THE INVENTION

In the figures, for the purposes of illustration and clarity, scales and proportions have not been strictly respected. Throughout the detailed description which follows with reference to the figures, unless stated to the contrary, each element of the exchanger is described as it is arranged when the exchanger is arranged within a suspension pylon for an aircraft engine. This configuration is illustrated in particular by FIG. 3.

Furthermore, identical, similar or analogous elements are designated by the same reference signs in all the figures.

FIG. 1 illustrates a longitudinal cross-sectional view of an exchanger 10 in accordance with one embodiment of the invention, which comprises two bundles 10*a*, 10*b* juxtaposed one beside the other on both sides of a central juxtaposition axis 12 which extends in the longitudinal direction L.

In the embodiment shown in the figures, the two bundles are separated by a closure bar.

Each bundle 10*a*, 10*b* comprises a plurality of plates 15 which each extend in the longitudinal direction. These plates 15 are, for example, metal plates which are brazed onto an external armature to keep them in a parallelepiped arrangement.

These plates 15 define, in twos, flow ducts for the air flows which themselves form the counterflow hot and cold passes of the bundle.

The bundle 10*a* is housed in a housing which comprises, at a first longitudinal end, an end wall formed by two inclined openwork planes 24*a*, 24*b* and, at an opposing second longitudinal end, an end wall formed by two inclined openwork planes 26*a*, 26*b*. The planes 24*a* and 24*b* are connected to each other by a joint edge 24*c* which extends perpendicularly to the longitudinal direction L. The planes 26*a* and 26*b* are connected to each other by a joint edge 26*c* which extends perpendicularly to the longitudinal direction L and parallel to the edge 24*c*.

The adjacent bundle 10*b* is housed in a housing which comprises, at a first longitudinal end, an end wall formed by two inclined openwork planes 25*a*, 25*b* and, at an opposing second longitudinal end, an end wall formed by two inclined openwork planes 27*a*, 27*b*. The planes 25*a* and 25*b* are connected to each other by a joint edge 25*c* which extends perpendicularly to the longitudinal direction L. The planes 27*a* and 27*b* are connected to each other by a joint edge 27*c* which extends perpendicularly to the longitudinal direction L and parallel to the edge 25*c*.

The inclined openwork planes 24*a*, 25*a*, 26*a* and 27*a* each form a side inlet or a side outlet of one of the (hot or cold) passes of the bundle.

The inclined openwork planes 26*b* and 27*b* of the two bundles arranged facing each other form a common inlet or a common outlet of the bundles and the inclined openwork planes 24*b*, 25*b* arranged at the other longitudinal end form a conjugate common inlet or a common outlet.

In all the figures, the solid arrows represent the main flow direction of the cold air flow within (and in the proximity of) the exchanger and the dotted arrows represent the main flow direction of the hot air flow within (and in the proximity of) the exchanger.

In FIG. 1, the hot passes of the two bundles 10*a*, 10*b* are in fluid communication with the common inlet 30 formed by the walls 26*b* and 27*b* and the common outlet 32 formed by the walls 24*b* and 25*b*.

The cold passes of the two bundles are in fluid communication with the separate side inlets formed by the openwork planes 24*a* and 25*a* and the separate side outlets formed by the openwork planes 26*a* and 27*a*.

In other words, the hot passes of the two bundles 10*a*, 10*b* are supplied by the common inlet 30 and open into the common outlet 32, and the cold passes of the two bundles 10*a*, 10*b* are supplied by the separate side inlets 24*a*, 25*a* and open into the separate side outlets 26*a*, 27*a*.

FIG. 2 schematically illustrates a perspective view of an exchanger of a pylon in accordance with one embodiment of the invention enabling the general shape of the exchanger to be grasped. In this view, it is also possible to see some of the openwork walls forming the inlets and/or outlets.

Figure 3:
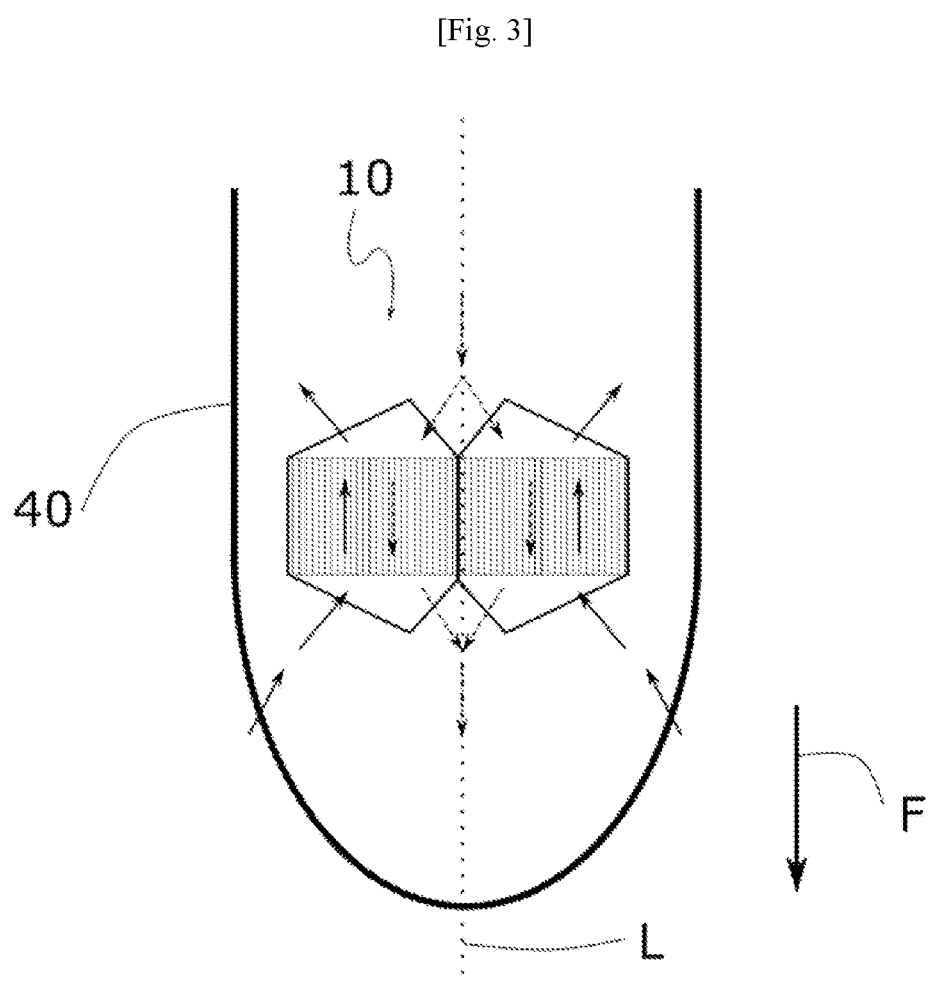

FIG. 3 schematically illustrates a pylon 40 in accordance with one embodiment of the invention comprising the exchanger of FIG. 1. This exchanger can be fixed in the pylon by any means within the immediate scope of the person skilled in the art.

The pylon houses the exchanger 10 so that the longitudinal direction L of the exchanger coincides with the main direction of the pylon (which coincides with the main axis of the engine and the main direction of movement of the aircraft).

The cold air inlets formed by the walls 24*a* and 25*a* are arranged towards the front of the aircraft. In this way, the side inlets for cold air can be supplied by the ambient air present on both sides of the pylon 40 when the aircraft is moving in the direction of the arrow referenced F in FIG. 3.

Air intakes arranged on both sides of the pylon 40 make it possible to supply the air of the cold passes of the exchanger 10 and thus to ensure the cooling of the hot air directed towards the exchanger 10 by suitable conduits from a source of hot air, which is, for example, air drawn from the propulsion engine (not illustrated in FIG. 3) carried by the pylon 40.

The invention claimed is:

1. A suspension pylon for a propulsion engine of an aircraft under a wing of an aircraft having a main axis, characterized in that it comprises:

a counterflow cooling exchanger of a flow of hot primary air by a flow of cold secondary air flowing oppositely to each other in a direction, referred to as the longitudinal direction (L), coinciding with said main axis of said engine, said exchanger comprising two plate exchanger blocks, referred to as bundles, juxtaposed one beside the other on both sides of a central juxtaposition axis extending in said longitudinal direction (L), and each comprising:

a plurality of parallel longitudinal plates forming in alternation flow ducts for the flow of hot primary air, which define a hot pass of the bundle, and flow ducts for the flow of cold secondary air, which define a cold pass of the bundle, a single hot air inlet and a single hot air outlet arranged respectively at each longitudinal end of said bundle, a single cold air inlet and a single cold air outlet arranged respectively at each longitudinal end of said bundle, said hot passes of the two bundles being in fluid communication with a central inlet common to the two bundles forming said single hot air inlets of the two bundles and a central outlet common to the two bundles forming said single hot air outlets of said bundles, and said cold passes of the two bundles being in fluid communication with separate side inlets and side outlets which diverge laterally from said central axis, said separate side inlets being supplied by fresh ambient air drawn from the proximity of said pylon, conduits for distribution of hot air suitable for fluidly connecting a device for drawing air from said aircraft engine and said central inlet common to the two bundles.

2. The pylon as claimed in claim 1, wherein said cold and/or hot passes of the two bundles of said exchanger are separated by a central closure bar.

3. The pylon as claimed in claim 1 wherein each bundle of said exchanger is housed in a housing comprising, at each longitudinal end, an end wall formed from two openwork planes inclined with respect to the longitudinal direction (L) and connected by a joint edge which extends perpendicularly to said longitudinal direction (L), each inclined openwork plane forming a side inlet or a side outlet of one of the passes of said bundle, and each pair of inclined openwork planes of the two bundles arranged facing each other forming an inlet common to said bundles and/or an outlet common to said bundles.

* * * * *